United States Patent
Fong

(10) Patent No.: US 8,202,151 B2
(45) Date of Patent: Jun. 19, 2012

(54) COMPETITIVE GAMING METHOD AND SYSTEM

(75) Inventor: Colin Fong, Lane Cove (AU)

(73) Assignee: Aristocrat Technologies Australia Pty Ltd (AU)

( * ) Notice: Subject to any disclaimer, the term of this patent is extended or adjusted under 35 U.S.C. 154(b) by 0 days.

(21) Appl. No.: 13/155,148

(22) Filed: Jun. 7, 2011

(65) Prior Publication Data

US 2011/0237336 A1    Sep. 29, 2011

Related U.S. Application Data

(63) Continuation of application No. 11/851,112, filed on Sep. 6, 2007, now Pat. No. 7,985,128.

(30) Foreign Application Priority Data

Sep. 6, 2006    (AU) ................................ 2006904909

(51) Int. Cl.
*A63F 13/00* (2006.01)

(52) U.S. Cl. ............... 463/16; 463/17; 463/18; 463/19; 463/20; 463/26; 463/27

(58) Field of Classification Search .............. 463/16–20, 463/26–27

See application file for complete search history.

(56) References Cited

U.S. PATENT DOCUMENTS

| | | | | |
|---|---|---|---|---|
| 5,664,998 A * | 9/1997 | Seelig et al. | .................... | 463/20 |
| 6,012,982 A * | 1/2000 | Piechowiak et al. | ............ | 463/16 |
| 6,089,980 A * | 7/2000 | Gauselmann | .................... | 463/27 |
| 6,210,275 B1 * | 4/2001 | Olsen | .............................. | 463/16 |
| 6,309,299 B1 * | 10/2001 | Weiss | ................................ | 463/20 |
| 6,837,793 B2 * | 1/2005 | McClintic | ....................... | 463/42 |
| 6,869,361 B2 * | 3/2005 | Sharpless et al. | ............... | 463/25 |
| 6,902,478 B2 * | 6/2005 | McClintic | ....................... | 463/16 |
| 6,984,174 B2 * | 1/2006 | Cannon et al. | .................. | 463/25 |
| 7,314,408 B2 * | 1/2008 | Cannon | ............................ | 463/16 |
| 7,458,889 B2 * | 12/2008 | Gauselmann | ................... | 463/16 |
| 2003/0036430 A1 * | 2/2003 | Cannon | ........................... | 463/42 |
| 2003/0119576 A1 * | 6/2003 | McClintic et al. | .............. | 463/20 |
| 2003/0222402 A1 * | 12/2003 | Olive | ............................ | 273/292 |
| 2005/0020340 A1 * | 1/2005 | Cannon | ........................... | 463/16 |
| 2005/0096130 A1 * | 5/2005 | Mullins | ........................... | 463/27 |
| 2005/0181856 A1 * | 8/2005 | Cannon et al. | .................. | 463/16 |
| 2005/0282609 A1 * | 12/2005 | Olive | .............................. | 463/16 |
| 2006/0073897 A1 * | 4/2006 | Englman et al. | ................ | 463/42 |
| 2008/0032764 A1 * | 2/2008 | Cannon | ........................... | 463/16 |
| 2009/0247277 A1 * | 10/2009 | Caspers et al. | .................. | 463/20 |

* cited by examiner

*Primary Examiner* — Dmitry Suhol
*Assistant Examiner* — David Duffy
(74) *Attorney, Agent, or Firm* — McAndrews, Held & Malloy, Ltd.

(57) ABSTRACT

Disclosed is gaming apparatus, which may be a gaming system and a method of gaming implemented on gaming apparatus. A plurality of linked gaming machines are monitored for the occurrence of a first event. The number of occurrences of the first event for each gaming machine is recorded. On the occurrence of a second event, a bonus is awarded on each said gaming machine on which at least one monitored occurrence of the first event has occurred, the bonus award being dependent on the number of occurrences of the first event.

10 Claims, 10 Drawing Sheets

COMPETITIVE GAMING METHOD AND SYSTEM

RELATED APPLICATIONS

This application claims priority as a continuation to co-pending U.S. patent application Ser. No. 11/851,112 filed on Sep. 6, 2007, entitled "Competitive Gaming Method and System", which claims priority to Australian Patent Application No. AU2006904909, having an international filing date of Sep. 6, 2006, both of which are hereby incorporated by reference herein in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to gaming apparatus and methods of gaming. A particular embodiment of the present invention relates to competitive gaming using gaming machines.

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming machines therefore are faced with restrictions on the types of games and gaming apparatus that are allowable, both in terms of the prevailing regulations and in terms of providing a return on investment to the gaming venue operators.

In addition, it is important that a player be able to understand the operation of a game quickly so that the player can start to quickly play the game and therefore extract maximum entertainment from the game.

One method for providing potentially increased entertainment from a game is to offer one or more progressive prizes and/or one or more other special prizes separate from those specified by the pay table of a game played on a gaming machine. When such prizes are paid, the designer and/or operator of the gaming machines must determine when and how each special prize is to be paid.

A special prize may be able to be won by a number of linked gaming machines. In this case, the designer and/or operator of the gaming machines must determine a fair way for each gaming machine to win the special prize. It is an ongoing problem to find new ways of offering special prizes on gaming machines.

BRIEF SUMMARY OF THE INVENTION

According to a first aspect of the present invention, there is provided a method of providing a competitive bonus game on gaming apparatus that includes plurality of linked gaming machines, the method including:

operating each of the plurality of linked gaming machines to provide game play of a game in which a player places a wager on the occurrence of a winning combination as an outcome of the game and the representations of one or more said outcomes are presented on one or more displays of the gaming machine, the gaming machine awarding an award if a winning combination occurs;

monitoring for occurrence of a first outcome during play of the game on each of the gaming machines, the first outcome occurring with substantially equal probability on each of the gaming machines, the representations of the first outcome being either the same or different between the gaming machines;

storing an electronic record of the occurrence of the first outcome on each of the gaming machines and displaying representations of the occurrences of the first outcome on one or more displays of the gaming apparatus, the representations being persistent across separate game plays of the game;

when a trigger event occurs, operating the gaming apparatus in a competition mode in which one or more of the gaming machines enter into a competition;

wherein when the gaming apparatus is in the competition mode, the method further includes: identifying from the electronic record on which gaming machines the first outcome has occurred;

completing a first round of the competition by determining one or more scores for each of the identified gaming machines, wherein the value of a said score or the number of said scores for a said gaming machine is dependent on the number of occurrences of the first outcome on that gaming machine, as recorded in the electronic record, wherein progression by a gaming machine in the competition is dependent on the score or scores determined for that gaming machine;

completing at least one further round of the competition by determining one or more scores for each gaming machine that has progressed in the competition past the first round, each round designed to eliminate gaming machines from the competition;

awarding an award to a said gaming machine that progresses through all of the rounds of the competition; and displaying representations on one or more displays of the gaming apparatus of the competition.

In one embodiment, the method may include continuing to monitor for occurrence of the first outcome and when the certain number of the first outcome reoccurs, again placing the gaming apparatus into a competition mode to run a further competition in which occurrences of the first outcome used in a previous competition are disregarded for the further competition. Each gaming machine may allow continued play of the game while the gaming apparatus is placed in the competition mode.

In one embodiment, the process of displaying representations on one or more displays of the gaming apparatus of the competition includes displaying a character to represent each score of a gaming machine and removing said character from the display for the purposes of each subsequent round if the score that it represents does not cause the gaming machine to progress in the competition. The method may further include, for a said character that represents a score that does not cause the gaming machine to progress in the competition, displaying on the one or more displays an animation of that character that represents the characters being removed from the competition. In one embodiment, the method may further include for a said character that represents a score that does cause the gaming machine to progress in the competition, displaying on the one or more displays an animation of that character that represents the characters progressing in the competition. The characters from each gaming machine may be displayed to be distinguishable from each other.

In one embodiment, a plurality of scores are determined for at least one gaming machine, each representing an entry into the competition so that if any one of the scores progresses the gaming machine past the current round of the competition, then the gaming machine progresses in the competition. When a gaming machine progresses in the competition, the number of scores determined for the next round may be dependent on the number of scores that are of a value so as to progress the gaming machine to that next round.

In one embodiment, the number of scores determined for each gaming machine in the first round may be dependent on the number of first outcomes that are recorded in the electronic record as having occurred.

In one embodiment, the trigger event occurs when the electronic record indicates that a certain number of first outcomes has occurred, the number being measured by the number of occurrences on any one of the gaming machines or by the total number of occurrences across the plurality of gaming machines.

According to a second aspect of the present invention there is provided a method for use with a plurality of linked gaming machines, the method including monitoring on each of a plurality of linked gaming machines for the occurrence of a first event during play of a game in which a plurality of symbols are presented and if a winning combination occurs the gaming machine awards an award, and monitoring the number of occurrences of the first event on each said gaming machine, wherein following at least one monitored occurrence of the first event on at least one of the gaming machines, the method further includes monitoring play of the game for the occurrence of a second event, and on the occurrence of the second event awarding a bonus award on each said gaming machine on which at least one monitored occurrence of the first event has occurred, the bonus award being dependent on the number of occurrences of the first event.

In one embodiment, the method includes only awarding the bonus award after at least one monitored occurrence of the first event has occurred on at least two of the gaming machines.

In one embodiment, the first event may be different for at least two of the plurality of linked gaming machines. The second event may also be different for at least two of the plurality of linked gaming machines.

In one embodiment, the first event occurs with constant and substantially equal probability on each said gaming machine. The value of the bonus award or potential value of the bonus award may be dependent on the size of a wager placed immediately before the second event occurred. Alternatively, the probability of occurrence of the first event in any given game play is dependent on the size of a wager placed in that game play. The probability of occurrence of the first event may occur with substantially equal probability on each said gaming machine when equal sized wagers are placed. The size of a wager may be determined solely by the credits wagered per outcome.

In one embodiment, the bonus award is entry into a competition between the gaming machines for a second award, wherein the bonus award is dependent on the number of occurrences of the first event due to the number of occurrences of the first event affecting the likelihood of winning the competition. The method may include allowing each gaming machine to have a plurality of entries in the competition, the number of said entries determined by the number of occurrences of the first event on that gaming machine. Each entry of a gaming machine may be treated separately in the competition. Alternatively, the entries may be combined into a single collective entry.

According to a third aspect of the present invention there is provided a method for use with a gaming machine, the method including monitoring on the gaming machine for the occurrence of a first event during play of a game in which a plurality of symbols are presented and if a winning combination occurs the gaming machine awards an award, and monitoring the number of occurrences of the first event, wherein following at least one monitored occurrence of the first event the method further includes monitoring play of the game for the occurrence of a second event, and on the occurrence of the second event awarding a bonus award, the bonus award being dependent on the number of occurrences of the first event.

In one embodiment, an award is always awarded following the occurrence of the second event, but the value of the award is determined dependent on the number of occurrences of the first event.

In one embodiment, the award is a bonus game including at least one game play, wherein the method includes determining the number of game plays awarded in the second game dependent on the number of occurrences of the first event. The number of game plays awarded in the second game may be determined as being equal to the number of occurrences of the first event.

In one embodiment, the method includes awarding a second award dependent on the outcome of the bonus game. The second award may be at least one award selected from the group including: a fixed number of credits, a progressive prize, a physical prize and a monetary pay out.

In one embodiment, the second award can have any one of a plurality of values and the method includes determining a score from the outcome of the bonus game, and determining the value of the second award dependent on the value of the score. The method may include determining an interim score for each game play in the bonus game and the score determined from the outcome of the bonus game may be the highest interim score, or the sum or other mathematical combination of the interim scores or a selection of interim scores.

In one embodiment, the first event is at least one event or combination of events selected from the group: the occurrence of a particular symbol in the plurality of symbols that are presented, the passage of a randomly determined period of time, a recurring event related to game play of the game, for example a particular turnover on the gaming machine, or the purchase of a special symbol by a player of the gaming machine.

In one embodiment, the second event is at least one event or combination of events selected from the group: the occurrence of a particular combination of symbols in the game, the passage of a randomly determined period of time, an event related to game play of the game, for example turnover on the gaming machine or the value of a progressive prize, but independent of the occurrence of any particular combination of symbols, and the occurrence of a predetermined number of occurrences of the first event.

In one embodiment, the method includes only monitoring the number of occurrences of the first event during eligible periods of play. The eligible periods of play may include at least one of: game plays in which a predefined minimum wager has been staked, game plays in which the player has wagered an ante bet, game plays during a period defined by an operator or event related to game play of the game but independent of the occurrence of the first event.

In one embodiment, the method includes awarding the bonus award in the form of entry into a competition with at least one other gaming machine, wherein the number of occurrences of the first event on the gaming machine affects the likelihood of winning the competition.

According to a fourth aspect of the present invention there is provided a gaming system including a plurality of linked gaming machines, each gaming machine providing a game in which a plurality of symbols are presented on a display and if a winning combination occurs in the presented plurality of symbols, the gaming machine awards an award, the gaming system including an electronic processing system including one or more game controllers operable to, for each gaming machine:

monitor for the occurrence of a first and a second event on the gaming machine and maintain a counter of the number of occurrences of the first event; and when the counter indicates that there has been at least one occurrence of the first event, award a bonus award following the occurrence of the second event in the gaming system, the bonus award being dependent on the value of the counter.

In one embodiment, the bonus award includes at least one game play that results in an at least one outcome having a value, the likely value or value range of each said outcome being dependent on the value of the counter and wherein the game controller uses the value of the at least one outcome as a variable in awarding a second bonus award.

In one embodiment, the bonus award includes a number of game plays, each of which results in an outcome, and the number of game plays including the bonus award is determined by the number of occurrences of the first event, wherein the game controller uses the value of the outcomes as a variable in awarding a second bonus award.

In one embodiment, the game controller awards the bonus award to a selection of said gaming machines and compares the outcome or outcomes resulting from the game play or game plays of the selection of gaming machines and determines the second award to each gaming machine dependent on the comparison. The comparison may define winning and losing outcomes, wherein for gaming machines having a winning outcome, the second bonus award is the award of a second bonus game and for gaming machine having a losing outcome the second bonus award is the award of a prize. The second bonus game may be a competitive event between gaming machines with a winning outcome to determine which gaming machine is awarded which of a plurality of prizes.

According to a fifth aspect of the present invention there is provided a gaming machine having a game controller in communication with a display and a user interface that cooperate to provide a game in which a plurality of symbols are presented on the display and if a winning combination occurs in the presented plurality of symbols, the gaming machine awards an award, the game controller operable to:

monitor for the occurrence of a first and a second event during play of a game on each said gaming machine and maintain a counter of the number of occurrences of the first event; and when the counter indicates that there has been at least one occurrence of the first event, award a bonus award following the occurrence of the second event, the bonus award being dependent on the value of the counter.

According to a fifth aspect of the present invention, there is provided a method implemented on a gaming system including a plurality of linked gaming machines, the method including defining for each gaming machine a first event and a second event that may occur during play of that gaming machine, monitoring the number of occurrences of the first event during play of each gaming machine and following the occurrence of the second event on one of the gaming machines awarding an award to one of the gaming machines, wherein the probability of a said gaming machine winning the award is dependent on the number of occurrences of the first event.

According to a sixth aspect of the present invention, there is provided a gaming system including a plurality of linked gaming machines each operable to provide a game during which a first event and a second event may occur during play of that gaming machine, the gaming system including at least one game controller that maintains a counter for each gaming machine and increases the counter on the occurrence of a first event during play of the game on that gaming machine, the at least one game controller awarding a competitive bonus game between at least two of the gaming machines following the occurrence of the second event, the competitive bonus game arranged so that the probability of a gaming machine winning the bonus game is dependent on the value of its respective counter.

Further aspects of the present invention and further embodiments of the aspects described in the preceding paragraphs will become apparent from the following description, given by way of example and with reference to the accompanying drawings.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
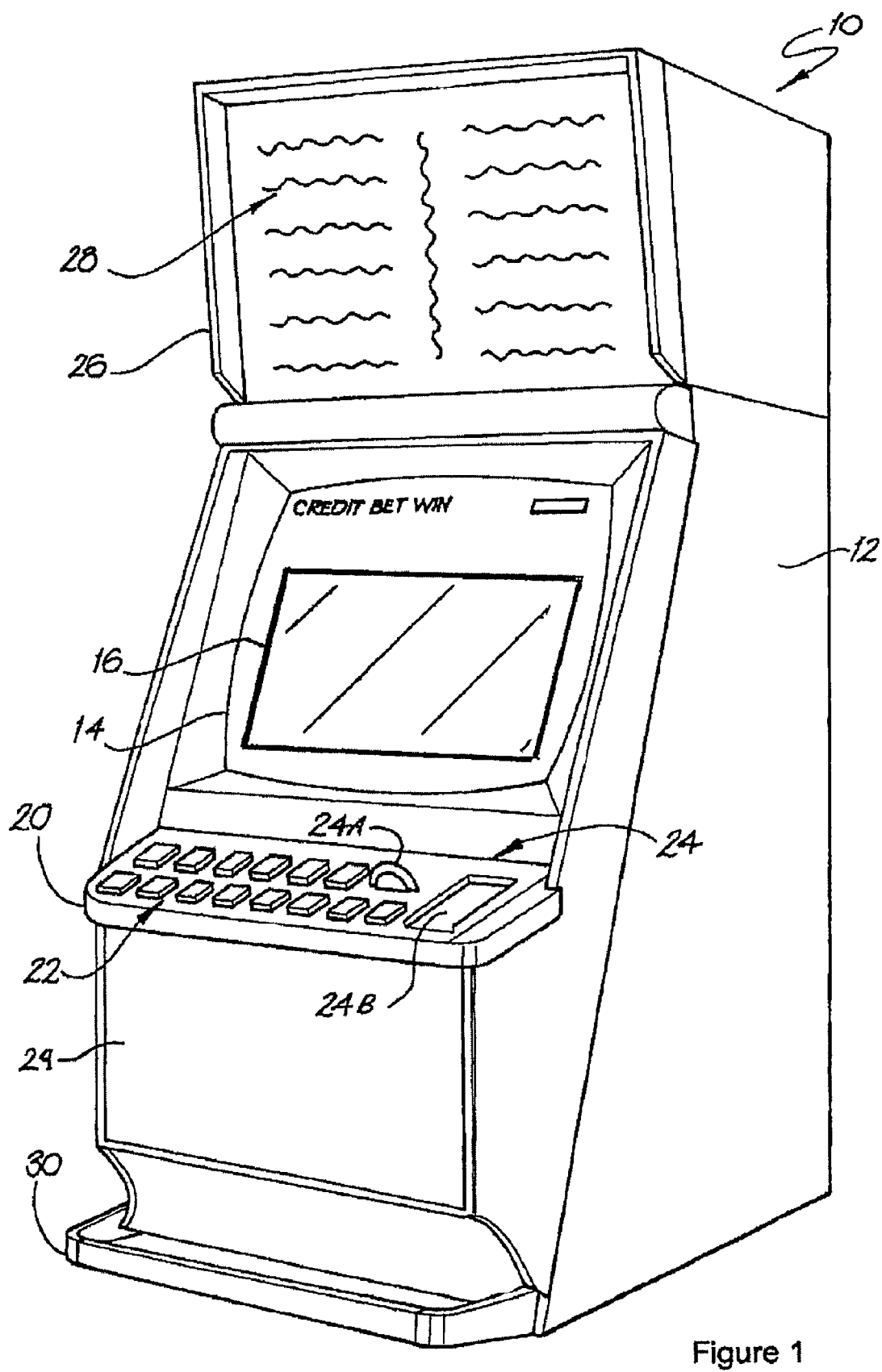
FIG. 1: shows diagrammatically, a view of a gaming machine suitable for implementing certain embodiments of the present invention.

In FIG. 1 of the accompanying drawings, one example of a gaming machine suitable for implementing certain embodiments of the present invention is generally referenced by arrow 10.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or a different type of display.

Figure 2:
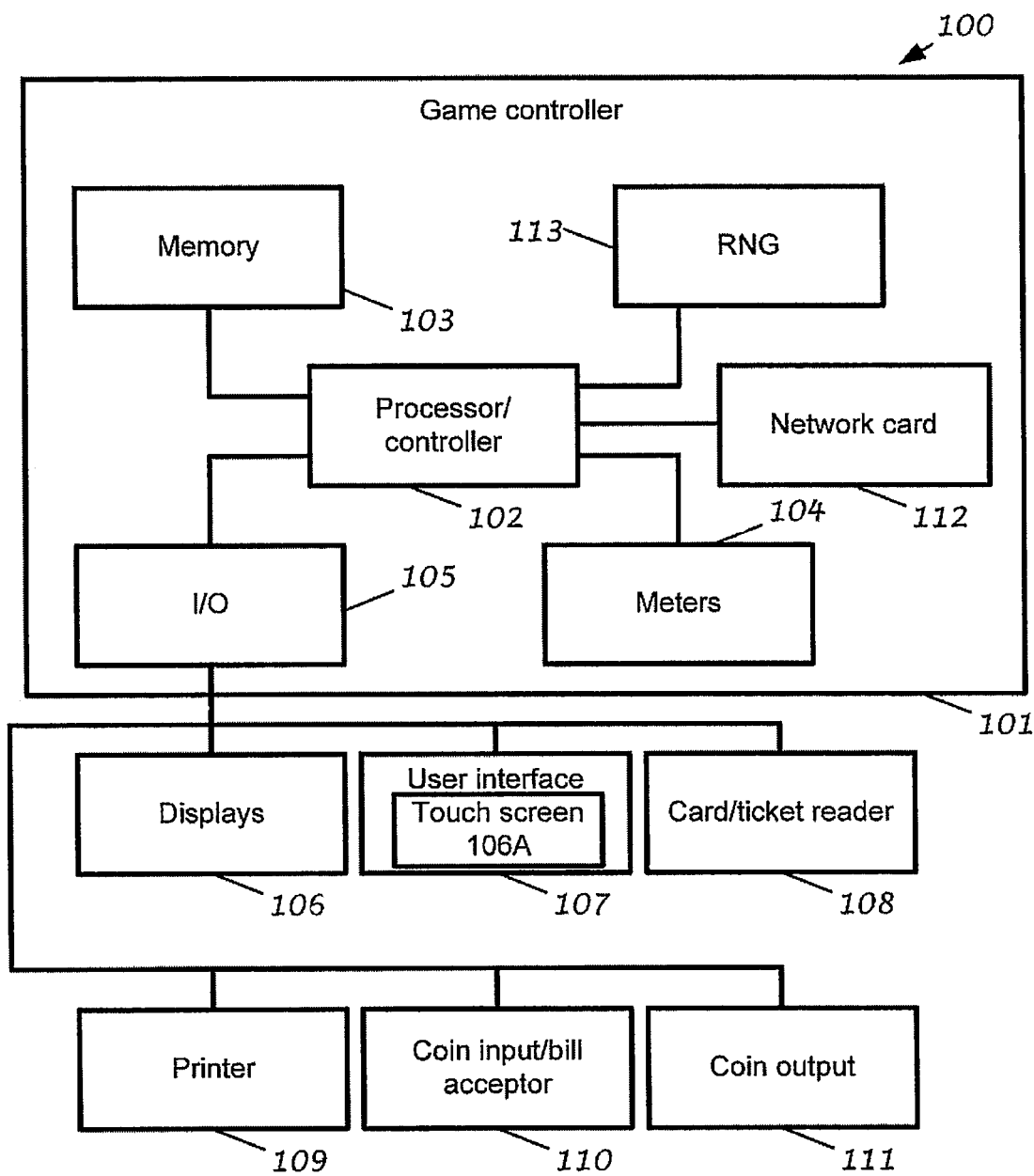
FIG. 2: shows a block diagram of gaming apparatus suitable for implementing certain embodiments of the present invention.

FIG. 2 shows a block diagram of a gaming apparatus, generally referenced by arrow 100, suitable for implementing certain embodiments of the present invention. The gaming apparatus 100 may, for example, operate as a standalone gaming machine of the type shown in FIG. 1. However, the gaming apparatus 100 may alternatively operate as a networked gaming machine, communicating with other network devices, such as one or more servers or other gaming machines. The gaming apparatus 100 may also have distributed hardware and software components that communicate with each other directly or through a network. Accordingly, different reference numerals have been used in FIG. 2 from FIG. 1 for components that may be equivalent.

The gaming apparatus 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with or forms a part of the computational device 102. Typically, the gaming apparatus 100 will include both volatile and non-volatile memory and more than one of each type of memory, with such memories being collectively represented by the memory 103. The instructions to cause the game controller 101 to implement the present invention will be stored in the memory 103.

The gaming apparatus may include hardware meters 104 for the purposes of regulatory compliance and also include an input/output (I/O) interface 105 for communicating with the peripheral devices of the gaming apparatus 100. The input/output interface 105 and/or the peripheral devices may be intelligent devices with their own memory for instructions and data.

In the example shown in FIG. 2, the peripheral devices that communicate with the controller are one or more displays 106, user input devices 107, a card and/or ticket reader 108, a printer 109, a bill acceptor and/or coin input mechanism 110 and a coin output mechanism 111.

One or more of the displays 106 may include a touch screen 106A, forming part of the user input devices 107. Additional devices may be included as part of the gaming machine 100, or devices omitted as required for the specific implementation.

In addition, the gaming machine 100 may include a communications interface, for example a network card 112. The network card, may for example, send status information, accounting information or other information to a central controller, server or database and receive data or commands from a the central controller, server or database. One or more of the peripheral devices, for example the card/ticket reader 108 may be able to communicate directly with the network card 112.

The game controller 101 may also include a random number generator 113, which generates a series of random numbers that determine the outcome of a series of random game events played as part of a game on the gaming apparatus 100.

Figure 4:
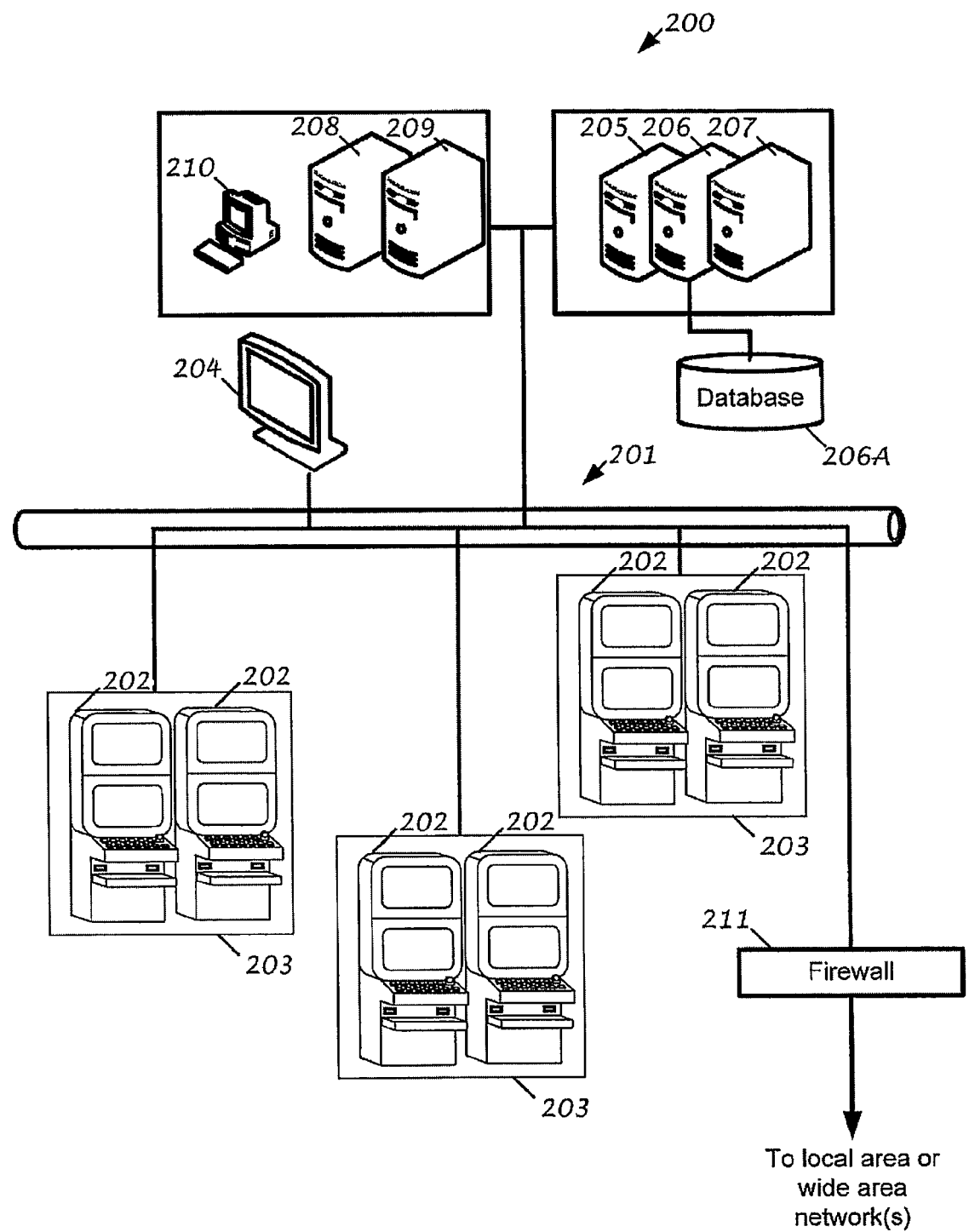
FIG. 4: shows diagrammatically, a network gaming system suitable for implementing certain embodiments of the present invention.

As explained in more detail in relation to FIG. 4, the computational device 102 may include two or more controllers or processors, which may be local or remote from each other and the displays 106.

Figure 3:
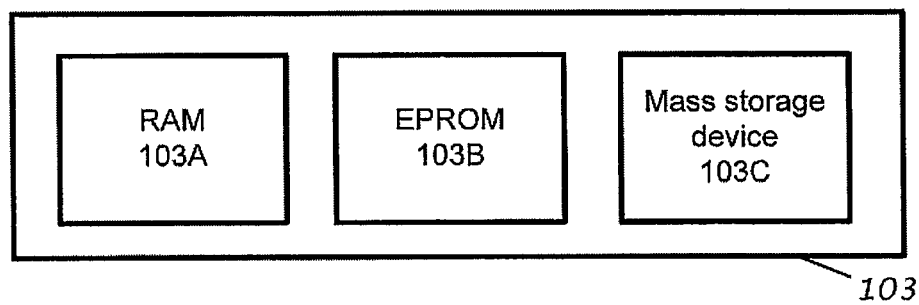
FIG. 3: shows a block diagram of components of the memory of the gaming apparatus represented in FIG. 2.

FIG. 3 shows an exemplary block diagram of the main components of the memory 103. The RAM 103A typically temporarily holds program files for execution by the computational controller 102 and related data. The EPROM 103B may hold be a boot ROM device and/or may contain some system or game related code. The mass storage device 103C is typically used to store game programs, the integrity of which may be verified and/or authenticated by the computational controller 102 using protected code from the EPROM 103B or elsewhere.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming apparatus 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

Servers may also be connected to the network 201. For example, a game server 205 may generate game outcomes for games played on the gaming devices 202, a database management server 206 may manage the storage of game programs and associated data for downloading or access by the gaming devices 202 in a database 206A, and a jackpot server 207 may control one or more jackpots associated with the gaming devices 202.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network. The various servers described in the gaming 200 may be separate physical servers or individual server processes run on the same physical device.

The gaming system 200 may communicate with other gaming systems, other local networks, for example a corporate network and/or a wide area network such as the Internet through a firewall 211.

FIGS. 5 to 9 show process flow diagrams of a process performed in accordance with an embodiment of the present invention. The process may be performed by and within the network gaming system 200, in which the gaming devices 202 may each include part or all of a gaming apparatus 100 and the following description assumes this implementation. However, those skilled in the relevant arts will appreciate that the process will also be able to be implemented by other gaming systems.

The process is described with reference to a game that is a spinning reel game of the type well known in the gaming industry. However, certain embodiments of the present invention have application to other types of games including card and dice games.

Figure 5:
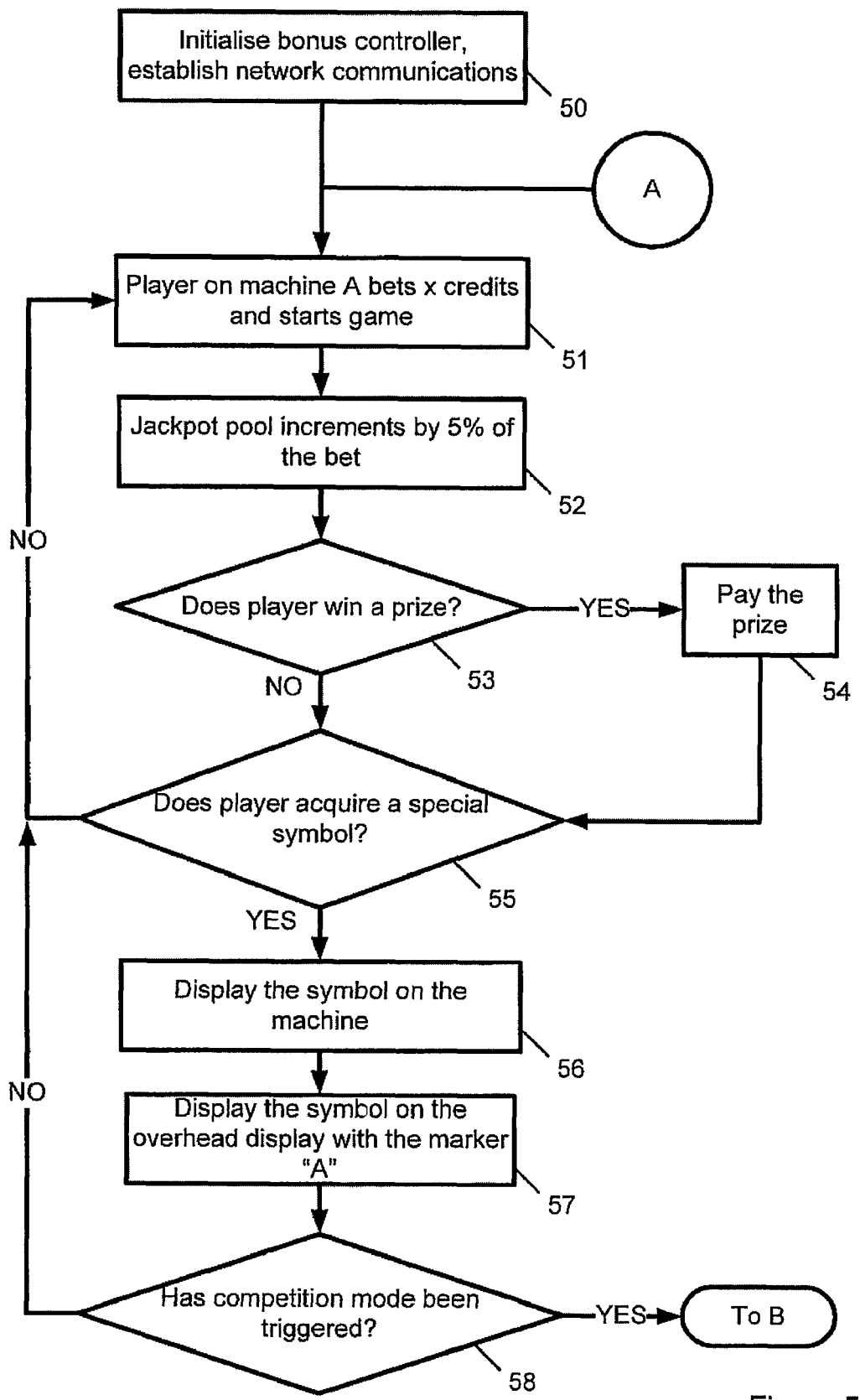
FIGS. 5-8: show flow diagrams of an exemplary process according to certain embodiments of the present invention, which may be implemented using the network gaming system of FIG. 4.

FIG. 5 shows a process flow diagram of play of a game 16, during the play of which the gaming system 200, suitably the game controller 101 associated with each gaming device 202, monitors for the occurrence of a first event and a second event. A definition of these events may be stored in the memory 103.

In the following example, the first event is the spinning up of a special symbol in a spinning reel game. However, other events may be used, including the passage of a randomly determined period of time or a recurring event related to game play of the game, for example a particular turnover on the gaming machine. The event may be determined dynamically, so that for example for every game play results in a 1/100 chance of the event occurring. A combination of two or more events may be used, the occurrence of either one of them resulting in advantage in the competition mode. Although in some embodiments it may be possible for a player to lose special symbols, for example by spinning a losing symbol, the preferred embodiment does not have this function.

The player may be required to make a payment, qualify through the achievement of a qualification criterion or set of criteria, or otherwise become eligible before monitoring for the first event occurs.

For example, the player may have to place an ante-bet to be eligible for recognition of the special symbol as a first event. The special symbol could be 'special' solely for the reason that it is recognised as the first event. Alternatively the designated special symbol may have other particular characteristics, such as operating as a WILD symbol.

Instead, the first event may only occur when the player has qualified or otherwise become eligible. For example, when there is a 1 in 100 chance of occurrence of the first event when the player is eligible, the gaming controller 101 may simply not make the determination of whether the event occurs unless the player is eligible.

The player may be given the option to purchase a special symbol, in which case the first event includes that purchase. For example, the player may purchase a special symbol, which may then be displayed on a display 106 as if it was spun up on a reel. Alternatively, the player may only be given the option to purchase a special symbol when it is spun up on a spinning reel, so that if the player does not purchase the special symbol they do not get the benefit of the special symbol when the competition mode is entered and if the player does purchase the special symbol, then they do get the benefit of the symbol.

In the following example, the second event is the occurrence of a particular number of the first event during a gaming session on a gaming device 202. The particular number may be evaluated against each gaming device 202 individually, or against a plurality of gaming devices 202 collectively. However, other events may be used, including the occurrence of a particular combination of symbols in a game played on a gaming device 202, the passage of a randomly determined period of time, being long enough so that it is likely that one or more occurrences of the first event can be expected to have happened during the period, an event related to game play of games on the gaming devices 202, for example collective turnover on the gaming devices 202, or the value of a linked progressive prize.

Occurrence of the first event is preferably dependent on game play at a gaming device 202, but the second event may be initiated either due to play of the game 16, or due to a game system parameter that does not distinguish between gaming devices 202. The definition of the first event may vary between gaming devices 202. It may be advantageous from a perspective of ease of game design that the first event occurs with equal probability on each gaming device 202, particularly in embodiments where there is competition between the gaming devices 202 for an award.

The process commences at step 50 and a bonus controller is initialised and network communications between the bonus controller and the gaming devices 202 are established. The bonus controller may be the jackpot server 207, which then effectively forms part of a game controller 101 for a gaming device 202. Initialisation of the bonus controller may include setting a jackpot pool to a seed value, and clearing any counters associated with game play. Once the initialisation procedures have been completed, the process proceeds to step 51, in which a game 16 is implemented on a gaming device 202. FIGS. 5 to 8 show the process as implemented from the viewpoint of a particular gaming device 202, which is referred to herein as "machine A".

In step 51, a player on machine A makes a wager of x credits and commences a game play of the game 16. The player may indicate the wager by operating the user interface 107. Machine A records the value of the amount bet and communicates this to the jackpot server 207 using its network card 112. The jackpot server 207 receives the communication and increments a jackpot pool associated with machine A by, in this example, 5% of the value of the wager. The computation of the increment amount may alternatively be made locally and communicated to the jackpot server 207.

Following play of the game commenced at step 51, machine A evaluates if the player has won a prize (step 53). In the case of a spinning reel game, a prize may be won by the spinning up of a winning combination of symbols in a pay line that the player has purchased by placing their wager. In this case, machine A looks up the winning combination in a pay table and pays the appropriate prize (step 54) and then proceeds to step 55. If the player of machine A did not win a prize, then the process proceeds directly from step 53 to step 55.

In step 55, machine A evaluates whether the player has acquired a special symbol. Special symbols may be acquired when they appear on the displayed part of a reel in a spinning reel game played on the gaming device 202. The special symbols may need to appear on a pay line that has been purchased by the player of the gaming device 202, or may be acquired regardless of whether they appear on a purchased pay line. The accumulation of the special symbol may be related to the number of credits bet per pay line. For example, if two bets are made per line, then a single occurrence of a special symbol may result in two special symbols being accumulated. Alternatively, the expected accumulation rate per game play may be independent of the bet size. When the accumulation rate is independent of the bet size, in some embodiments one or more of the prizes available to be won from the competition mode may be varied, for example multiplied by the wager made per line in a spinning reel game.

The special symbols may be any identifiable symbol in the game. If the player has not acquired a special symbol, the process returns to step 51 and play of the game 16 continues. If the player has acquired one or more special symbols, each acquired special symbol is displayed on machine A, for example in a section of the display 14, or in a display provided in the top box 26 (step 56). The special symbol is also displayed on an overhead display associated with machine A, suitably a display 204. The images displayed on the display 204 may be controlled by the jackpot controller 207, whereas the display of the symbol on machine A may be either controlled by the jackpot controller 207 or controlled by a graphics controller local to the gaming device 202.

Special symbols may optionally only be able to be acquired for eligible game plays. Eligible game plays may be game plays in which a certain minimum wager has been staked, game plays in which the player has wagered an ante bet, game plays during a period defined by an operator or otherwise.

Alternatively, the special symbols could be acquired, but the gaming device 202 may not be eligible to enter the competition (see herein below), and may display a message that a competition would have been able to have been entered if they had played in a manner to make them eligible. The gaming device 202 could then play a bonus game the outcome of which is not dependent on the acquisition of special symbols, the potential awards from this other bonus game, if provided, preferably being small in comparison to the awards available in the competition. This may encourage participation in the competition, participation in which may increase the enjoyment of a player of the gaming device 202.

In step 58, the game controller 101 evaluates whether competition mode has been triggered. Competition mode is triggered either by machine A, or by another gaming device 202, linked with machine A by virtue of also communicating with the jackpot controller 207 and contributing to the same jackpot as machine A, acquiring a certain number of special symbols, which may be the maximum number that can be acquired. If machine A is not in competition mode, the process returns to step 51, otherwise the process proceeds to B (see FIG. 6). If competition mode was triggered by another gaming device 202 (one that is not also controlled by the game controller 101) or by a system event, the game controller 101 monitors for receipt of a signal at its network card 112 that indicates this occurrence.

If machine A is to enter competition mode due to acquiring the required number of special symbols itself, it communicates the acquisition of the special symbols to the jackpot controller 207. The jackpot controller 207 then takes control of a display 106 to provide the competition mode, and instructs other gaming devices 202 linked to machine A by virtue of contributing to the same jackpot pool (refer to step 52) to enter into competition mode. Alternatively the jackpot controller 207 could inform the gaming machine 100 of which the gaming device 202 is a part, that the competition mode is to be entered, in which case control of the display 106 may be retained by the game controller 101 of that gaming machine instead of by a separate controller in the jackpot controller 207.

Figure 6:
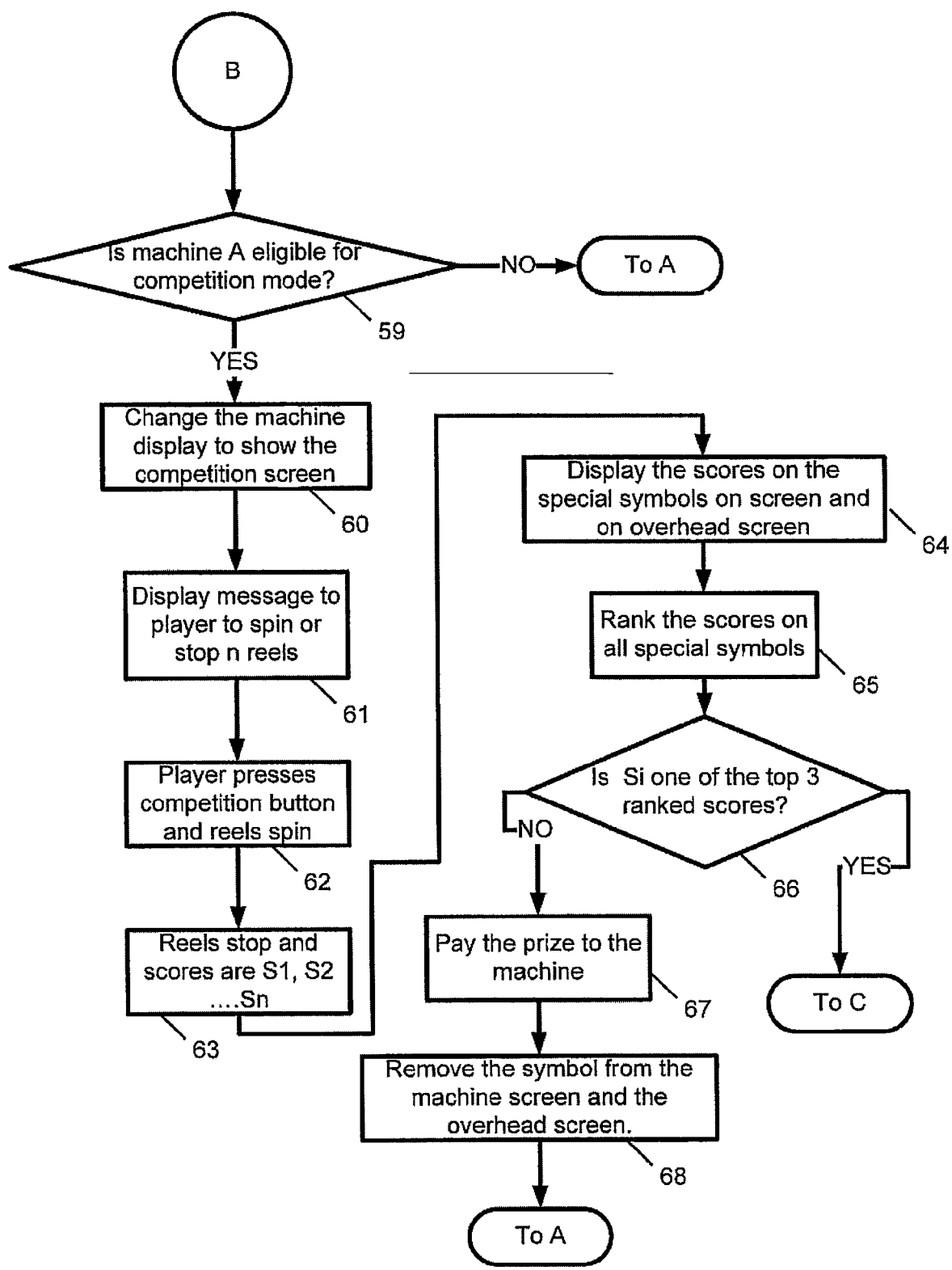

Referring now to FIG. 6, after a competition has been triggered, the game controller evaluates whether machine A is eligible to participate in the competition (step 59). Eligibility may be determined by machine A currently being played and having acquired a certain number of special symbols, for example one or more special symbols. If machine A is not eligible, then the process returns to step 51 to continue game play without participating in the competition. If machine A is eligible, the process proceeds to step 60, in which a display 106 of the gaming device 202 is controlled to display the competition screen to provide entertainment to the player and provide visual feedback as to the result of the competition.

Alternatively all of the linked gaming devices 202 that are currently being played may be eligible, for example with those not having acquired any special symbols having one entry to the competition (see herein below), and those that have acquired special symbols having more, perhaps substantially more, entries.

The competition may also be implemented as a spinning reel game, but may be otherwise implemented, for example as a dice game, card game, a numbers game or a pin and ball type game. In step 61, a message is displayed to the player to spin the reels (or stop the reels if they are already spinning). The number of reels that are spun (n) may be variable and determined dependent on the number of acquired special symbols. For example, if the player of machine A acquired only one special symbol, only one reel may spin, whereas acquiring five special symbols may result in five reels spinning. Although a one to one relationship between the number of special symbols acquired and the number of reels that are spun is described in this example, this is not necessary. Alternatively the number of reels could be fixed, with the outcome of the reel being multiplied by an amount specified by the number of acquired special symbols.

After the player presses a competition button in the user interface 107, or after a predetermined short time period expires, the n reels spin (step 62) and then stop to display one or more symbols that are used to determine one or more scores for the game play (step 63). The score may be indicated by a number that is spun up on each of the reels or a number associated with a symbol that is spun up on the reels. The score may be the sum of the scores from the reels, or alternatively the game play could result in a number of scores, one for each reel. The exemplary process shown in FIGS. 6 to 8 assume that the game play results in a score for each acquired special symbol, so that there are n scores Sl, S2, . . . Sn. Alternative methods of computing a score from the game may be used.

Next, in step 64, the score or scores resulting from the reel spin are displayed on the display 106 of machine A and on the display 204. The scores resulting from special symbols acquired at other gaming devices 202 linked to machine A may also be displayed on the display 204 and/or on the display 106. This may be performed by displaying a representation of a character for each special symbol and displaying above the character its score. Characters associated with different gaming devices 202 may be distinguished from each other, for example by being represented as dressed in different colour clothes. The characters may participate in a game scenario, which is affected by the outcome of the competition.

The scores of machine A are ranked in relation to the scores of other machines to which machine A is linked (step 65). A determination is then made whether any score, Si, of machine A is one of the top three ranked scores. If it is, the process proceeds to C (see FIG. 7). If not, a prize is paid to the player of machine A (step 67). The prize may be determined in a number of ways and may be a fixed monetary prize, which is optionally multiplied by the number of special symbols that were acquired, may be a prize depending on where in the ranking the score or scores of machine A were situated, may be a split of a consolation prize of fixed value or consolation jackpot incremented at a lower rate than the jackpot pool contributed to in step 52, or other prize. Alternatively no consolation prize is paid. In addition or alternatively, play in the competition may result in awards being awarded, such awards having no influence on the outcome of the competition.

Following payment of the consolation prize (if any), the acquired special symbols associated with machine A are removed from the display 106 of machine A and the display 204 (step 68), and the process returns to A (see FIG. 5). In the case that the gaming device 202 has two displays 106 one display may be used to allow continued game play, and the other used to display the normal game or games provided by the gaming device 202, allowing the player of machine A to view the result of the competition and continue playing a game, which may allow them to enter the next competition if they acquire the required number of special symbols. This may also allow longer period competition modes without substantially reducing the time available for players to play the game underlying the competition mode.

Figure 7:
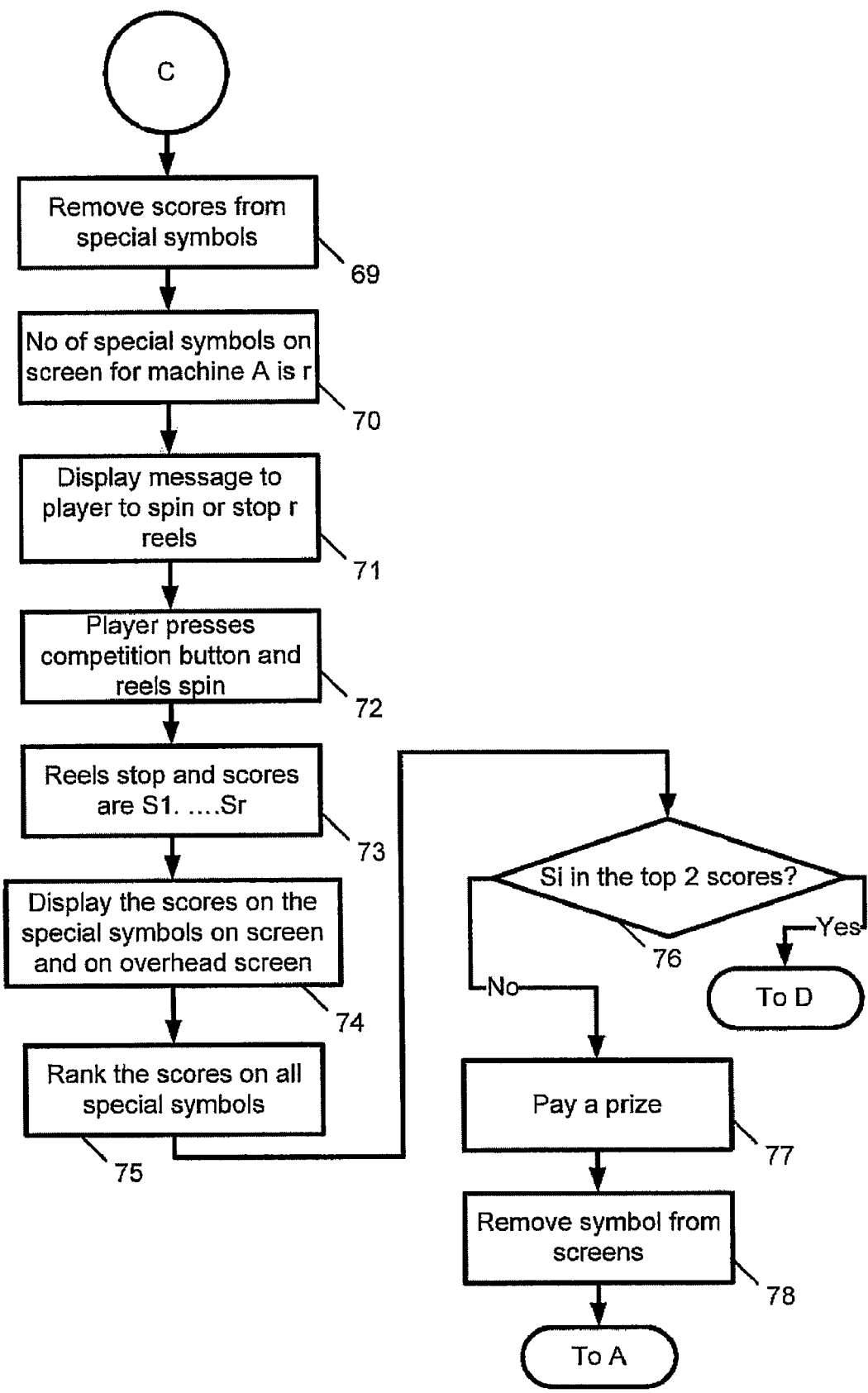

If at least one of the scores of machine A is determined to be one of the top ranked scores in step 66, the player of machine A enters into a second round of the competition. This second round is shown in FIG. 7. In step 69, the existing scores of the special symbols that have proceeded through to this round are removed from the display. The characters or other representations of the special symbols that have been eliminated from the competition are removed from the displays 106 and 204 and a consolation prize may be awarded to the player of machine A for each eliminated special symbol even if machine A has progressed to the second round. This leaves r special symbols represented for machine A, r being the number of scores that were in the top 3 scores as determined in step 66 and representations of the r special symbols are displayed on displays 106, 204 (step 70). r may be equal to three or may be greater than three because of the possibility of a plurality of scores from the same or different gaming devices 202 having the same value. In one embodiment, the range of available scores is specifically selected so that r is greater than three often.

A message is then displayed for the player to initiate the spin or stopping of reels (step 71) and the player initiates the game play (step 72). The number of reels that are spun, r, depends on the number of special symbols that the player has in this next round. When the reels stop, r scores Sl, S2, . . . Sr are determined, one for each special symbol in the second round (step 73) and these scores are displayed (step 74) and ranked in relation to the scores of other special symbols (step 75). Steps 71 to 75 may therefore be similar to steps 61 to 65 completed in the first round of the competition.

In step 76, the jackpot controller 207 or other controller in the gaming system 200 identifies the top two scores. If none of the special symbols of machine A resulted in one of the top two scores, the process proceeds to steps 77 and 78, in which case a consolation prize may be paid and the special symbols of machine A are removed from the displays 106, 204 and the process returns to A (see FIG. 5). If a special symbol of machine A is in the top two scores, the process proceeds to D (see FIG. 8), representing a final round of the competition.

Figure 8:
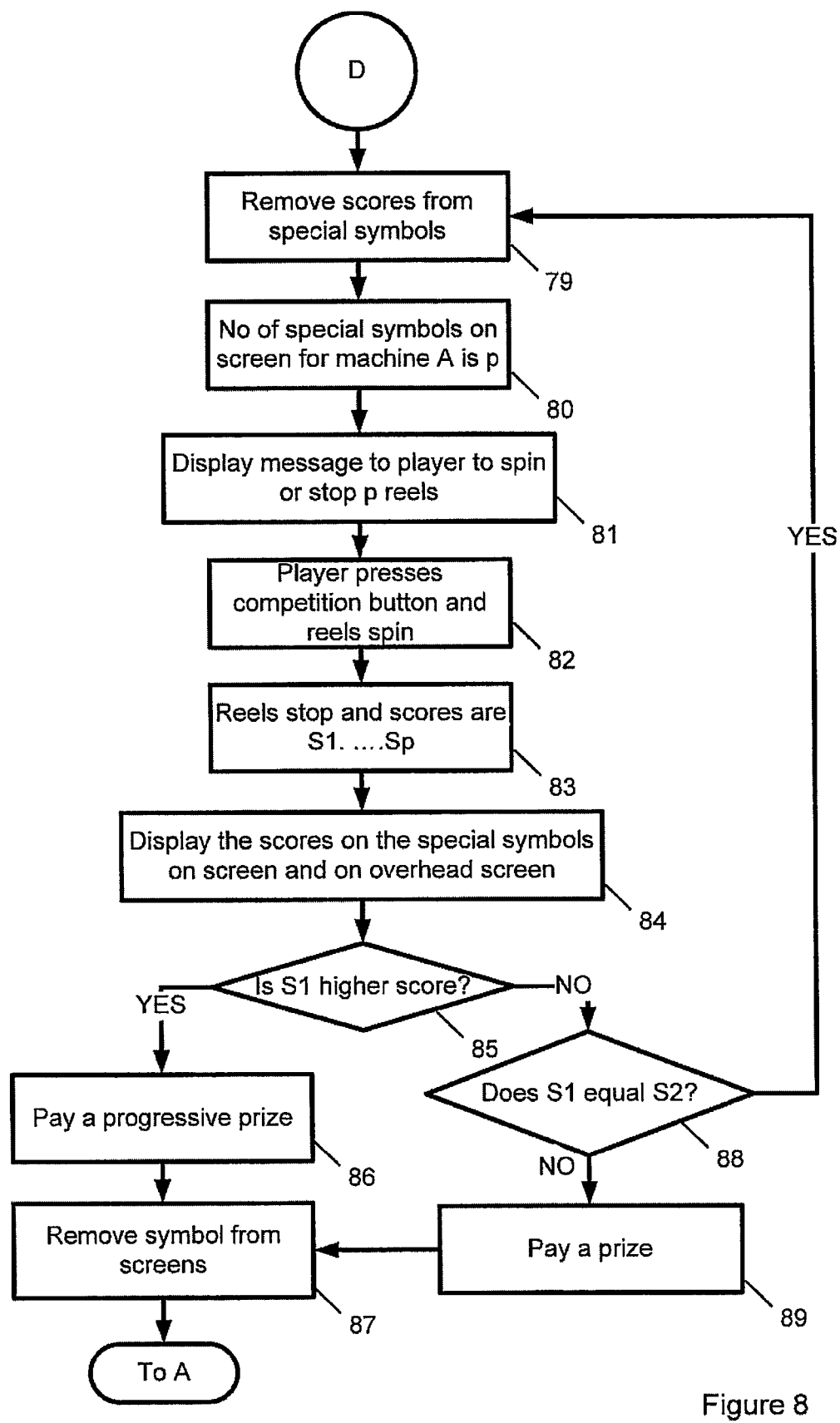

Referring now to FIG. 8, if the machine A enters into the final round, the scores are again removed from the special symbols (step 79), eliminated special symbols are removed from the displays 106 and 204 (with optional associated payment of a consolation prize), leaving p special symbols, including at least one symbol of machine A competing in the final round. Representations of the p special symbols are displayed on the displays 106, 204 (step 80). The final round of play is completed in steps 81 to 84 in the same manner as for game play in steps 61 to 64 and 71 to 74.

In step 85, the jackpot controller 207 evaluates whether the special symbols of machine A represent the highest score and if so the process proceeds to steps 86 and 87 in which the jackpot prize that was contributed to in step 52 (see FIG. 5) is paid to the player of machine A, the special symbols are removed from the screens and the process returns to A (see FIG. 5). The jackpot prize may optionally be multiplied by the credits bet per pay line by the player of machine A in the game that immediately preceded the triggering of the competition mode.

If the special symbols of machine A do not represent the highest score, the process 30 proceeds to step 88 in which the jackpot controller evaluates whether there has been a tie between the special symbols of machine A and the special symbols of another gaming device 202. If there has been a tie, the process returns to steps 79 and another final round is played. If there is not a tie, this means that machine A has been defeated in the final round, in which case a consolation prize may be paid in step 89, the special symbols are removed from the displays 106, 204 (step 87) and the process returns to A (see FIG. 5).

FIGS. 10 to 13 show schematic representations of four possible screen shots S1-54 respectively that may be displayed on one or more displays 106 (see FIG. 2) and/or on one or more displays 204 of the gaming system 200 (see FIG. 4). The screen shots 51-54 may be displayed as part of an animation or series of animations depicting how the competition plays out.

Figure 10:
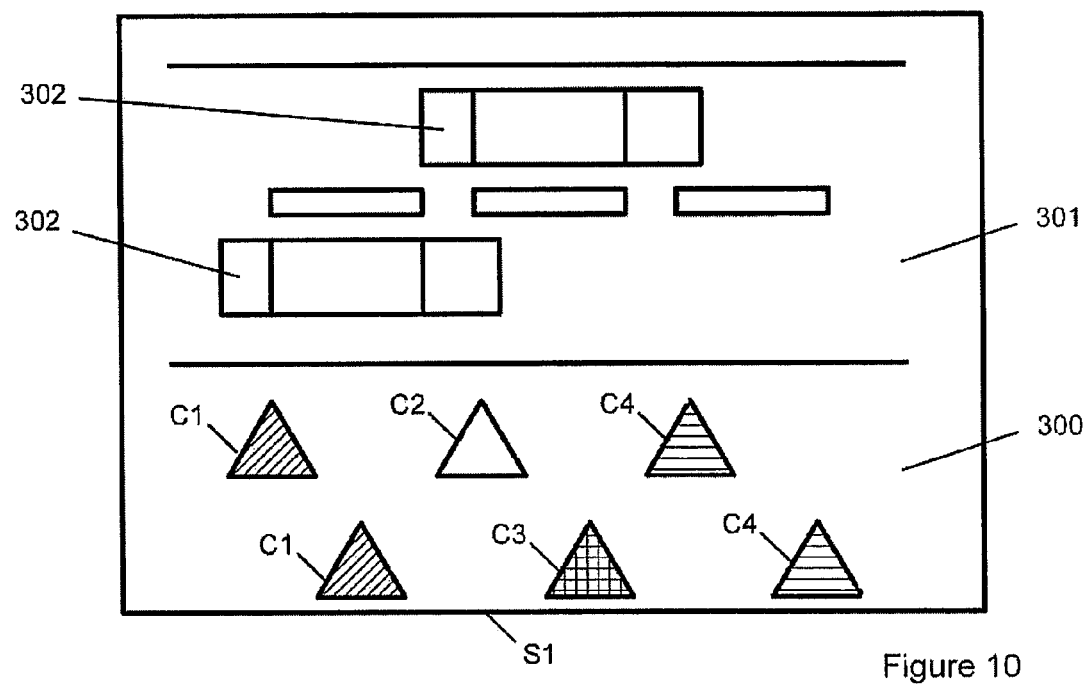
FIGS. 10 to 13: show schematically, possible screen shots that may be displayed on a display in a gaming system implementing an embodiment of the present invention.

FIG. 10 shows a screen shot S1 as it may appear at step 60 in FIG. 6. At this stage six special symbols have been accumulated through the play of four different gaming devices 202. Characters C1-C4 representing these special symbols are included in the screen shot S1. Two special symbols occurred on a first gaming device 202 since the last competition and is therefore allocated two characters C1. A second and a third gaming device 202 both had a single occurrence of a special symbol and are therefore allocated characters C2 and C3 respectively. A fourth gaming device 202 had two occurrences of a special symbol and therefore is allocated two characters C4.

Screen shot S1 may continue to be displayed while steps 61 to 63 are completed, with the reels involved in these steps displayed on the individual gaming devices 202 on a different screen to the screen shot S1 if the screen shot S1 is displayed on a display 106 of the gaming device 202. Alternatively the display may change during this process to represent the competition, for example to show a race between the characters.

The screen shot S1 includes a sidewalk 300 on which the characters C1-C4 are located and a road 301 next to the sidewalk. On the road 301 is shown two cars 302.

Figure 11:
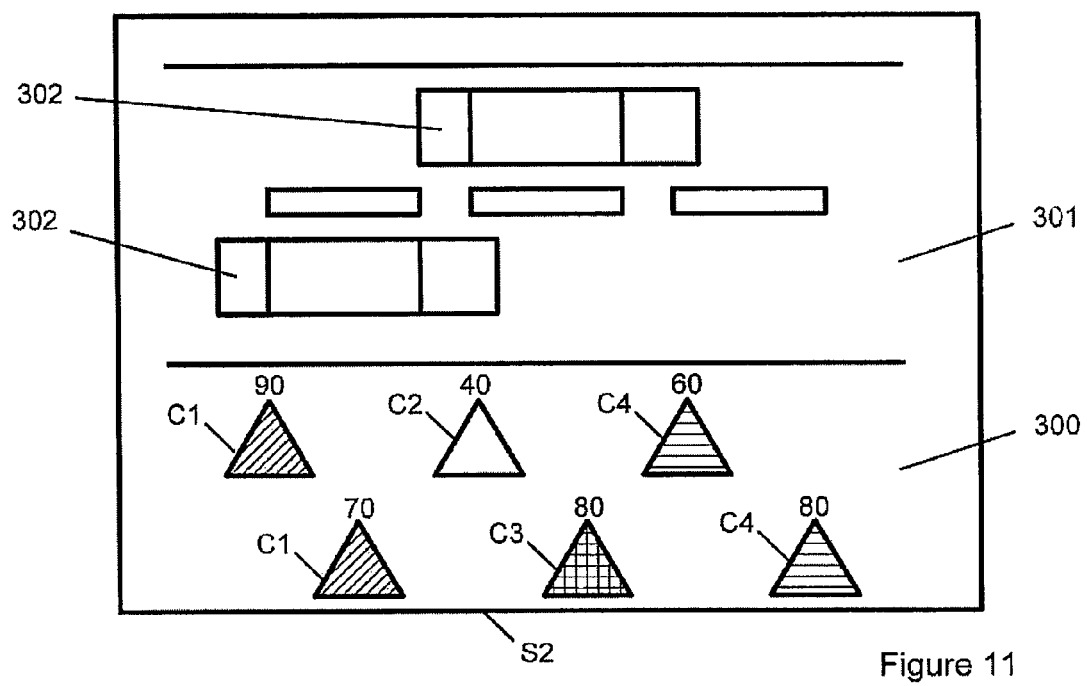

Referring to FIG. 11, screen shot S2 may be displayed at step 64. The scores resulting from step 63 are displayed above each character C1-C4. In the example the two characters C1 achieved scores of 90 and 70, characters C2 and C3 achieved scores of 40 and 80 respectively and the two characters C4 achieved scores of 60 and 80. Therefore, in step 66 it is determined that both characters C1, character C3 and one of the characters C4 have the top 3 ranked scores. These four characters progress to the next round whereas character C2 and one of the characters C4 do not progress. The display of the scores may be omitted in some embodiments.

Figure 12:
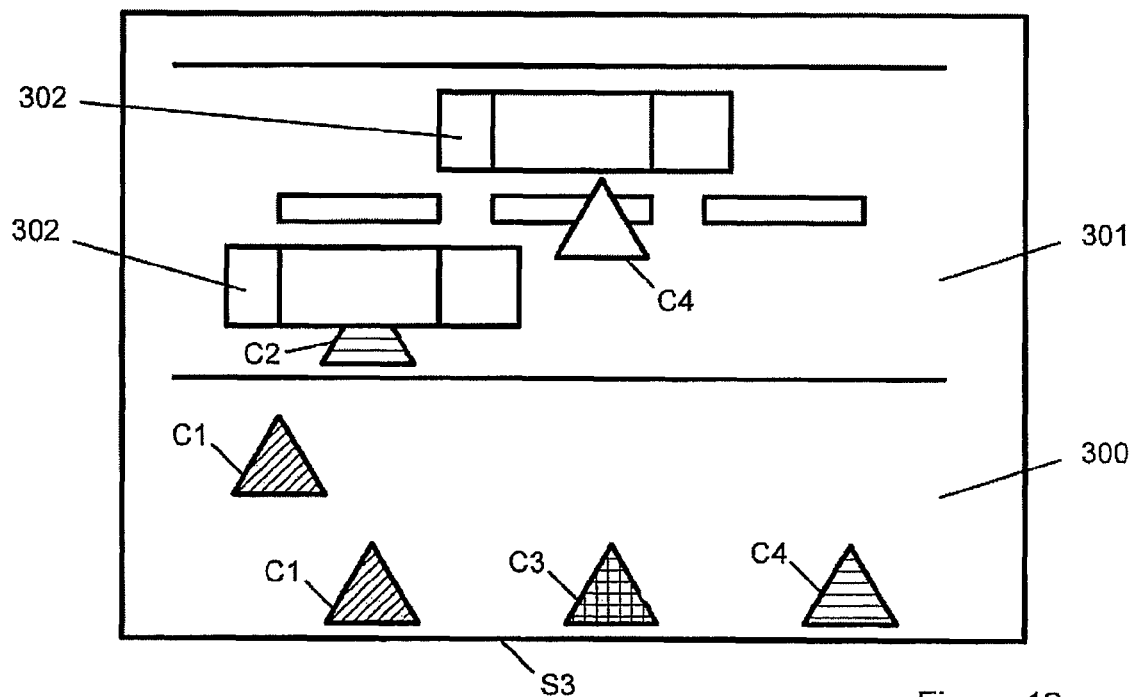

Referring to FIG. 12, screen shot S3 may be displayed following step 66. The characters not progressing are shown to enter one of the cars 302, which may drive off screen, leaving only the characters that progress to the next round. If a consolation prize is paid at step 67, images representing this may be displayed, for example the characters taking a small money bag with them into the cars 302.

Figure 13:
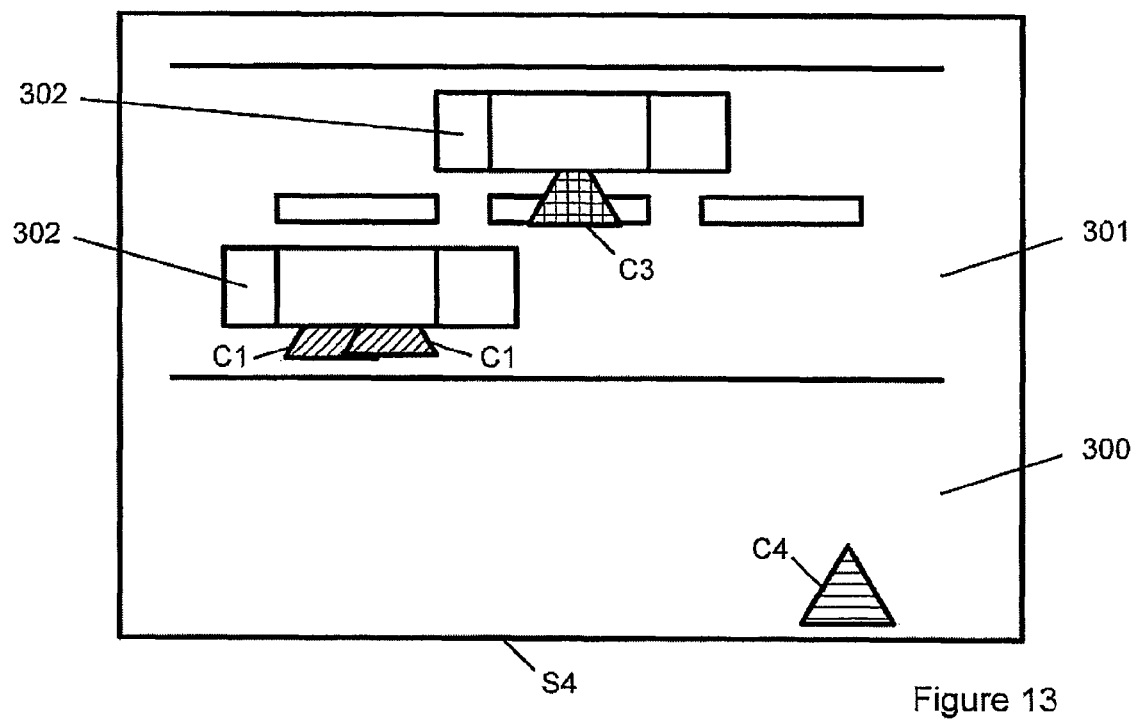

Referring to FIG. 13, screen shot S4 may be displayed at the end of the competition. All but one of the remaining characters enter a car 302, optionally taking a consolation prize with them, which may be represented as larger than the prize, if any, shown in screen shot S2. The cars 302 in subsequent rounds may be larger or otherwise visibly more valuable than the cars 302 displayed in earlier rounds.

The winning character C4 is the only one left on the display and the main prize is paid to the fourth gaming device 202, being the gaming device 202 on which the special symbol occurred that is represented by the character C4. The main prize may be, but is not necessarily, a progressive prize. A further animation may indicate the winner. For example a limousine may be shown to pick up the character C4. In some embodiments more than one winner may be possible, for example if there is no provision to break a tie in the last round of the competition, or if a tie-breaker process still results in a tie. IN this embodiment the main prize may be selected to be divisible and may be shared between the players.

While the example screen shots S1-S4 show the progressing characters remaining in place, in an alternative implementation the progressing players could enter the cars and travel to new location, where the next round of the competition is played. The locations and/or the cars transporting the player may become progressively more exclusive through the rounds. The characters that do not progress may not be animated, or alternatively could be animated as travelling off screen by 'walking' along the sidewalk 300, taking any consolation prize with them.

The process shown in FIGS. 5 to 8 implements a gaming system where players of gaming devices compete against each other for the jackpot prize. However, alternatively, a player of a gaming device 202 may compete against the gaming venue for a prize without regard to the outcomes for any other players. In this alternative, steps 50 to 58 (see FIG. 5) are completed as described herein above and the bonus controller may as described above be the game controller 101, which may include the jackpot server 207, depending on the particular implementation and depending on whether multiple linked gaming machines can win the same jackpot prizes.

Figure 9:
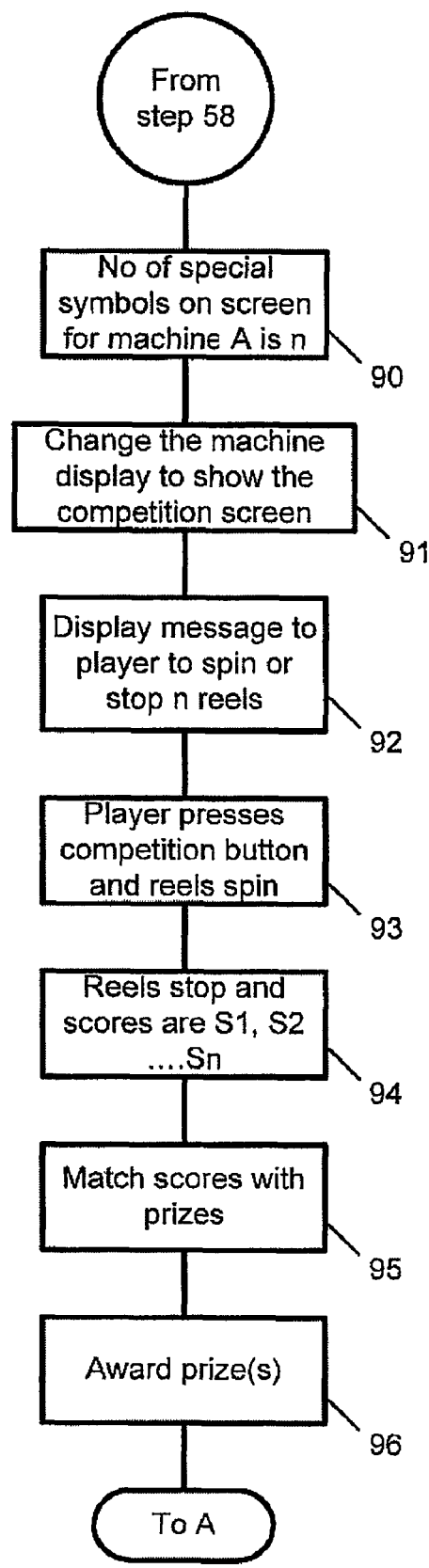
FIG. 9: shows a flow diagram of an alternative process according to certain embodiments of the present invention.

When competition mode has been determined to have been triggered in step 58, the process proceeds to step 90 (see FIG. 9). The machine A displays n special symbols, dependent on the number accumulated through game play and the display changes to the competition screen (step 91). Steps 92 to 94 are played in the same manner as for steps 61 to 63 (see FIG. 6). In step 95 the bonus controller matches the scores, or a single score, which may be the highest score Si, S2, Sn, a sum, product or other mathematical combination of the scores Si, S2, Sn or a score that is otherwise determined with a plurality of scores or ranges of scores associated with a corresponding plurality of prizes. For example a score between 1-10 may result in a first prize, a score between 11 and 20 a second level prize and so on. Depending on the score achieved, the matching award is then awarded (step 96).

While the foregoing description has been provided by way of example of certain embodiments of the present invention as presently contemplated, which utilise gaming apparatus and machines, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known 20 equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of competitive bonus game for use with a gaming networking having a game processor and a plurality of gaming machines, the method including:
   receiving a first wager at a said gaming machine for a first game;
   detecting occurrences of a first outcome during play of said first game among the gaming machines;
   identifying each of said gaming machines that have detected the occurrence of a first outcome;
   entering at least one of the identified said plurality of gaming machines into a competition mode in response to an event having been triggered;
   in a first round of competition in said competition mode, determining, via the game processor, a first score for each of said identified gaming machines dependent on a number of occurrences of said first outcome on the respective said identified gaming machine prior to said event having been triggered;
   progressing each of said identified gaming machines to a next round of competition in response to a respective said score being within a range;
   in said next round of competition, determining a second score for each of said identified gaming machines that have progressed into said next round dependent on a number of occurrences of said first outcome prior to said event having been triggered;
   awarding an award to a said gaming machine that progresses through all rounds of the competition; and
   displaying representations the competition.

2. The method of claim 1, wherein each of said gaming machine continues play of the first game while in the competition mode.

3. The method of claim 1, wherein displaying representations further comprises:
   displaying a character to represent each score of a said identified gaming machine; and
   removing said character from said displaying in a subsequent round in response to said score being outside said range.

4. The method of claim 3, further comprising displaying an animation of said character being removed from said competition in response to said score being outside said range.

5. The method of claim 3, further comprising displaying an animation of said character progressing in said competition in response to said score being within said range.

6. The method of claim 3, wherein said character from a said gaming machine is distinguishable from any other character from another said gaming machine.

7. The method of claim 1, further comprising determining a plurality of said first scores wherein the number of scores is dependent on a number of occurrences of said first outcome for at least one gaming machine, and wherein said at least one gaming machine progresses from said first round of competition to said next round of competition based on any one score of said plurality of scores.

8. The method of claim 7, and wherein when a gaming machine progresses in the competition, the number of scores determined for the next round is dependent on the number of scores that are of a value so as to progress the gaming machine to that next round.

9. The method of claim 1, and wherein a number of first scores are determined for each gaming machine in the first round, said first scores being dependent on the number of first outcomes of said each gaming machine that have occurred prior to said event having been triggered.

10. The method of claim 1, wherein the trigger event occurs when a number of first outcomes has occurred, the number being measured by the number of occurrences on any one of the gaming machines or by the total number of occurrences across the plurality of gaming machines.

* * * * *